United States Patent [19]
Menk et al.

[11] Patent Number: 5,937,531
[45] Date of Patent: Aug. 17, 1999

[54] ADJUSTABLE SPACING TOOL

[75] Inventors: Timothy D. Menk, South Ryegate; Stephen C. Restelli, Ryegate; Michael O. Blair, Groton, all of Vt.

[73] Assignee: Frame Master, Inc., Wells River, Vt.

[21] Appl. No.: 08/902,988

[22] Filed: Jul. 30, 1997

Related U.S. Application Data

[60] Provisional application No. 60/023,631, Aug. 9, 1996.

[51] Int. Cl.$^6$ ...................................................... G01B 3/30
[52] U.S. Cl. ................................. 33/613; 33/533; 33/645
[58] Field of Search ............................. 33/613, 562, 533, 33/645

[56] References Cited

U.S. PATENT DOCUMENTS

| | | | |
|---|---|---|---|
| 2,686,959 | 8/1954 | Robinson | 33/613 |
| 3,201,874 | 8/1965 | Christy | 33/613 |
| 4,625,415 | 12/1986 | Diamontis | 33/562 |
| 5,129,153 | 7/1992 | Burns, Sr. | 33/613 |
| 5,279,041 | 1/1994 | Wright | 33/379 |
| 5,490,334 | 2/1996 | Payne | 33/613 |
| 5,628,119 | 5/1997 | Bingham et al. | 33/613 |
| 5,822,942 | 10/1998 | Lucia, Jr. | 33/533 |

*Primary Examiner*—Christopher W. Fulton
*Attorney, Agent, or Firm*—Michael J. Weins; Jeffrey E. Semprebon

[57] ABSTRACT

The present invention is a tool for spacing frame members having an elongated body which has a first and a second track. A cradle, formed by a first head and a second head, can be adjusted to accommodate a first frame member of width W, and a shoulder, formed by a third head, can be spaced apart from the cradle to engage a second frame member, separated from the first frame member by a spacing interval I. Each of the heads slidably engage the first track and the second track of the elongated body, and each have an indexing face which is substantially normal to the elongated body. The heads are lockable with respect to the first and second tracks. Preferably, the elongated body has a bubble level to aid in identifying when the body is horizontal. When a bubble level is employed, each head has a levelling surface, the levelling surfaces being co-planar, providing a discontinuous reference surface for levelling. Preferably, the elongated body is provided with indicia to indicate standard values for the spacing interval I. A fourth head may be provided, and the third head and the fourth head form a second cradle. The heads may be configured to be adjustably attachable to a pre-existing beam level, which then serves as the elongated body of a spacing tool, and therefore have utility in their own right.

22 Claims, 10 Drawing Sheets

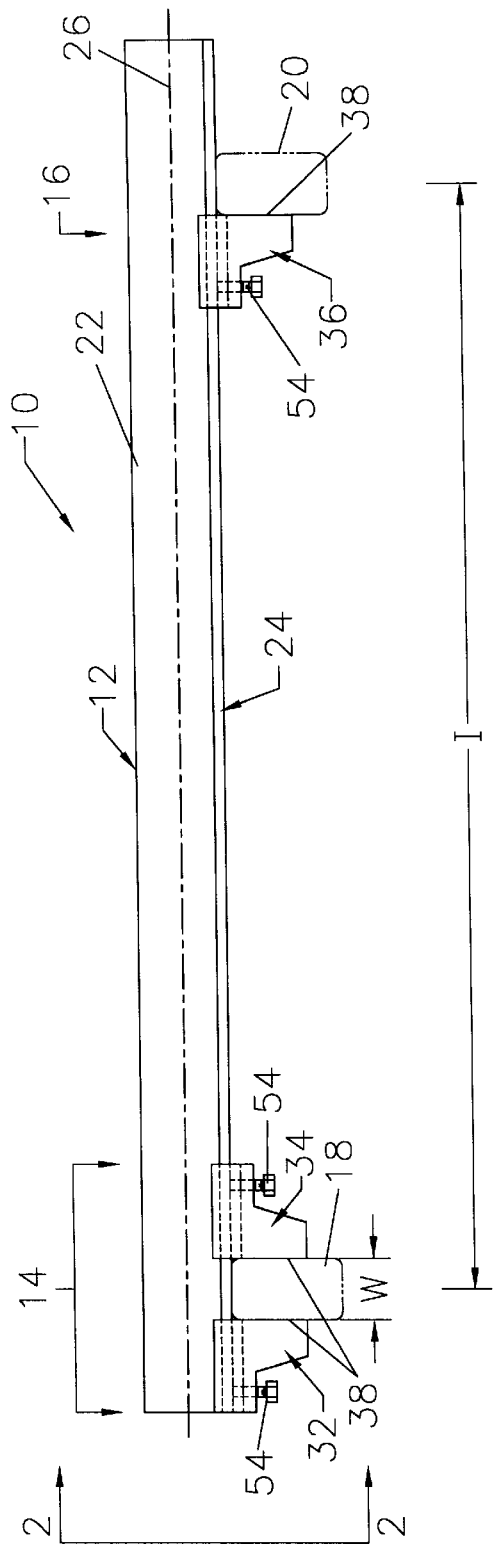
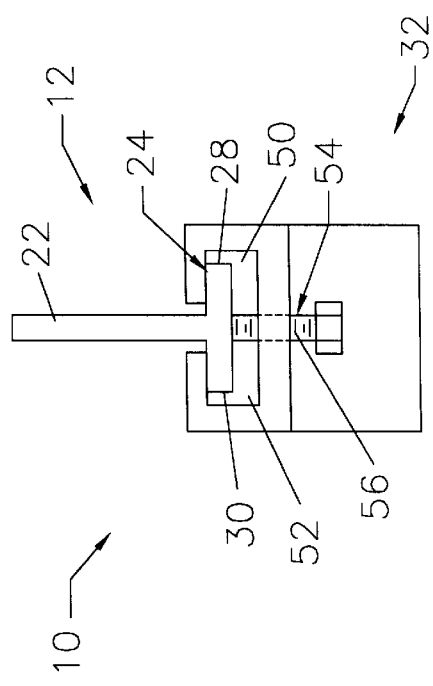
Figure 1
Figure 2

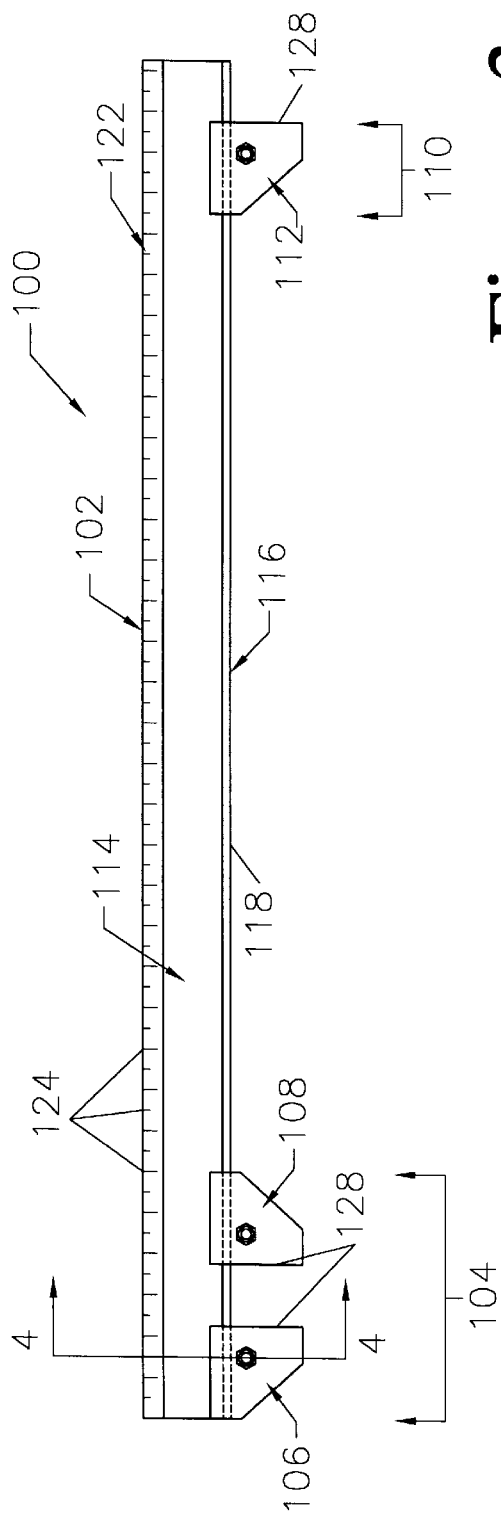
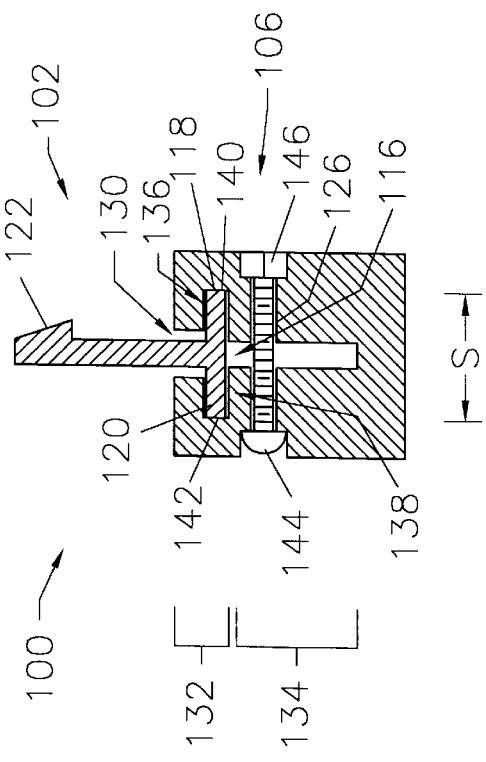
Figure 3
Figure 4

ADJUSTABLE SPACING TOOL

This application claims priority of provisional application No. 60/023,631 filed Aug. 09, 1996.

FIELD OF THE INVENTION

The present invention relates to a tool for spacing framing members for walls, floors, and roofs during construction of buildings.

BACKGROUND OF THE INVENTION

A variety of devices for spacing studs, joists, rafters, and similar frame members during construction have been reported in the patent literature. Many of these spacing tools enable the user to position a frame member with respect to a previously positioned frame member prior to attachment to the frame. In particular, U.S. Pat. No. 5,490,334, assigned to the assignee of the present application and incorporated herein by reference, discloses a spacing tool which accomplishes the above as well as assists in speeding construction. Using the spacing tool of the '334 patent, a newly positioned and attached frame member serves as a reference to position a subsequent frame member, and the process is repeated until the frame assembly is complete. The spacing tool of the '334 patent has a cradle and shoulder for engaging the frame members, set apart at a fixed distance corresponding to the desired spacing interval.

Classically, construction frame members have consisted of lumber with a nominal width of two inches and have been separated by spacing intervals of sixteen inches from center to center. For this reason, spacing tools have usually been designed to accommodate such fixed frame member width and spacing interval dimensions. More recently, construction has used fabricated lumber, such as wooden I beams, prefabricated trusses, or metal studs, which are produced in various widths and utilize various center-to-center spacing intervals. Thus there is a need for a spacing tool which can accommodate a variety of frame member widths, such as 1½", 1¾", 2⁵⁄₁₆", and 3½". Additionally, the spacing interval may be varied, with spacing intervals of 12 inches, 13.7 inches, 16 inches, 19.2 inches, and 24 inches being frequently used. Thus, there is also a need for a spacing tool where the spacing interval can be varied.

The need to adjust the spacing interval between the frame members and allow for adjustment to accept frame members of various widths has in part been met by the '334 patent which discloses an adjustable spacing tool having an elongated body, a cradle, and a shoulder. The cradle is composed of two brackets, the separation of which is adjustable by sliding the brackets longitudinally along a channel in the elongated body with which they are slidably and lockably engaged to accommodate various widths of frame members. The shoulder is formed by a third bracket which is longitudinally adjustable by sliding along a second channel in the elongated body with which it is slidably and lockably engaged. The employment of first and second channels to vary the separation between the cradle and the shoulder enables the spacing interval between the frame members to be varied to only a limited degree. Furthermore, the teaching of the '334 patent results in a tool of reduced strength and rigidity and increases the complexity of fabrication of the spacing tool by requiring channels which must either be machined or, when molded, the mold for which requires retractable inserts which greatly increase the mold cost.

Thus, there is a need for a rigid, relatively high strength spacing tool which can be simply manufactured and which will accommodate a wide range of variation in both the frame member width and the spacing interval.

SUMMARY OF THE INVENTION

The present invention provides a spacing tool which, in an elementary form, has a cradle and a shoulder which slidably engage an elongated body. The cradle can be adjusted to accommodate a first frame member of width W. The shoulder can be independently adjusted with respect to the cradle so that, when the first frame member is engaged by the cradle and the shoulder is brought into contact with a second frame member, the two frame members will be separated by a spacing interval I.

The elongated body has a longitudinal axis, and a first track and a second track which extend along the elongated body and are parallel to the longitudinal axis.

The cradle is formed by a first head and a second head which slidably engage the first track and the second track of the elongated body, and are adjustable with respect to each other and with respect to the elongated body. The shoulder is formed by a third head which slidably engages the first track and the second track and is adjustable thereon.

Each of the heads has an indexing face which is substantially normal to the longitudinal axis when the heads are slidably engaged with the elongated body. The indexing faces serve to engage frame members during the framing operation. Means for locking the heads with respect to the elongated body are provided to secure the heads in position.

When the heads and the elongated body are assembled for use, the first head and the second head are disposed on the elongated body in an opposed relationship, with the first head indexing face in a face-to-face relationship with the second head indexing face and positioned at a separation W therefrom. The second head may be identical to the first head and mounted with a reversed orientation or, alternatively, may be a mirror image of the first head. The third head is disposed on the elongated body in one of two positions. The first position being such that, if the first head were translated by the spacing interval I, it would be superimposed on the third head. The second position is such that, if the second head were translated by the spacing interval I, it would be superimposed on the third head. It is preferred that the first position for the third head be employed, allowing the spacing tool to be used for spacing frame members in the manner described in the '334 patent.

For applications where it is desired to hold the frame members in position relative to each other, the spacing tool is provided with a fourth head mounted in an opposed relationship to the third head. The third and fourth heads, in combination, form a second cradle. When both a first cradle and second cradle are provided, the spacing tool can be used to maintain frame members at the desired spacing interval I, freeing the hands of the user for other tasks.

While the invention will be discussed in terms of an elongated body and multiple heads slidably engaged with the elongated body, it should be noted that the heads have utility as attachments to be used with a pre-existing beam level which can serve as the elongated body.

It is preferred that the elongated body be formed with a substantially rectangular section having a lower flange extending therefrom and perpendicular thereto. The lower flange is bounded by a first terminal flange edge and a second terminal flange edge.

When the elongated body has a lower flange, it is preferred that the heads are provided with paired ears which are co-planar with the lower flange of the elongated body and straddle the lower flange. These paired ears provide additional stability between the spacing tool and the first and second frame members. Preferably, the paired ears of all of the heads have a the same thickness t, allowing the paired ears to be used for spacing closely-spaced construction members, such as decking, with a gap of width t between the members.

A preferred means for locking the head with respect to the elongated body is a head body-engaging element and a means for bringing the head body-engaging element into forcible engagement with the elongated body.

In one preferred embodiment, the head body-engaging element is provided by an advancable shaft mounted in the head. Preferably, a threaded shaft is employed which threadably engages and passes through the head. In such case, the threads serve as means for bringing the head body-engaging element into forcible engagement with the elongated body when the threaded shaft is turned.

In other preferred embodiments, the head body-engaging element is provided by a first locking component and a second locking component which are separated by a head gap separation S and slidably engage, respectively, the first track and the second track. For such an embodiment, the means for bringing the head body-engaging element into forcible engagement with the elongated body is a means for varying the head gap separation S. When the head gap separation S is reduced, the first locking component approaches the second locking component, bringing the first locking component into forcible engagement with the first track and the second locking component into forcible engagement with the second track.

It is further preferred that the head be provided with a head slot, having a slot main body-embracing region in which the first locking component and the second locking component reside, and a slot extension region. When the head has a head slot so configured, a bolt passing through the head and traversing the slot extension region can be employed as the means for varying the head gap separation S.

In one preferred embodiment, the first terminal flange edge and the second terminal flange edge serve, respectively, as the first and second tracks. For this embodiment, the heads each have a first channel, having a first channel base surface which slidably engages the first terminal flange edge of the lower flange. The heads also each have a second channel, having a second channel base surface which slidably engages the second terminal flange edge of the lower flange. The first channel base surface serves as the first locking component and the second channel base surface serves as the second locking component.

It is further preferred that each of the heads be a two-part structure, having a first head section and a second head section which, when joined, provide the head slot having a slot main body-embracing region and a slot extension region therebetween. Again, it is preferred to use a bolt passing through the head and traversing the slot extension region as the means for reducing the head gap separation S.

In another preferred embodiment, in addition to employing a lower flange on the elongated body, a first rail is positioned in a parallel relationship to the lower flange, the first rail being separated from the lower flange such that the first rail and the lower flange, in combination with the rectangular section of the elongated body to which they are attached, form a first longitudinal slot. The first longitudinal slot is aligned with the longitudinal axis of the elongated body and serves as the first track. Similarly, a second rail is positioned in a parallel relationship to the lower flange, the second rail being separated from the lower flange such that the second rail and lower flange, in combination with the rectangular section of the elongated body to which they are attached, form a second longitudinal slot. The second longitudinal slot is aligned with the longitudinal axis of the elongated body and serves as the second track.

In this embodiment, each of the heads have a first protrusion, which slidably engages the first longitudinal slot and serves as the first locking component, and a second protrusion, which slidably engages the second longitudinal slot and serves as the second locking component.

When a lower flange is employed on the elongated body, it is further preferred that an upper flange be provided which is parallel to the lower flange to provide additional rigidity. It is still further preferred to provide truss supports which span between the lower flange and the upper flange.

In one preferred embodiment, which employs a first rail and a second rail as part of the first and second track, a third rail and a fourth rail are also employed which are positioned in close proximity to the upper flange and, in combination with the upper flange and rectangular section of the elongated body, form respectively a third longitudinal slot and a fourth longitudinal slot, which serve as a third track and a fourth track. If truss supports are employed in this embodiment, they span between the first and third rails and between the second and fourth rails. Such a configuration provides the elongated body which can be made symmetric with respect to the central axis and facilitates fabrication of the elongated body by injection molding of plastic, by decreasing the chance of warpage.

When a third and fourth track are provided, additional heads can be slidably engaged with the third and fourth tracks, and can be locked with respect thereto in order to space frame members at a second spacing interval $I_2$.

For the embodiments which have an elongated body formed with at least one flange, it is preferred that at least one bubble level be mounted in the elongated body and aligned with the flange. The elongated body will then serve as levelling instrument with the flange serving as a reference surface. It is further preferred to provide at least one additional bubble level aligned perpendicularly to the flange, indicating when the reference surface is vertical.

When the elongated body is provided with one or more bubble levels, it is preferred for the heads to be provided with head levelling surfaces. These head levelling surfaces are co-planar when the heads are slidably engaged with the first and second tracks, and are parallel to the longitudinal axis of the elongated body, providing a discontinuous reference surface for levelling which can be adjusted to span obstacles on the surface to be levelled.

In applications where the spacing tool is to be used to space frame members which are ferromagnetic, such as steel studs, it is preferred that the indexing faces which serve as head frame member engaging surfaces be provided with magnetic inserts. The magnetic inserts hold the spacing tool in engagement with the frame members being spaced, freeing the hands of the user for other tasks.

BRIEF DESCRIPTION OF THE FIGURES

FIG. 1 is a side view of an embodiment having a T-shaped elongated body with a lower flange, on which are slidably engaged three heads which form a cradle and a shoulder. The separation of the heads can be adjusted as needed to accommodate framing members of selected widths, as well as to establish a spacing interval which is appropriate for the framing members being set.

FIG. 2 is a view from plane 2—2 of FIG. 1, illustrating how the heads are engaged with the elongated body and are locked into position.

FIG. 3 is a side view of an embodiment having a substantially T-shaped elongated body with a flange attached thereto and a top edge indexed to serve as a measuring stick. Three heads are provided, each of which has a head slot with a slot main body-embracing region and a slot extension region.

FIG. 4 is view of section 4—4 of FIG. 3, showing additional details of one of the heads and their engagement with the elongated body. Each of the heads has a first channel having a first channel base surface, and a second channel having a second channel base surface, both residing in the slot main body-engaging region. A locking bolt which passes through the head and traverses the slot extension region serves as a means for bringing the first channel base surface and the second channel base surface into forcible engagement with the elongated body.

FIG. 10 also shows slot teeth provided on the first longitudinal slot.

BEST MODE OF CARRYING THE INVENTION INTO PRACTICE

Figure 5:
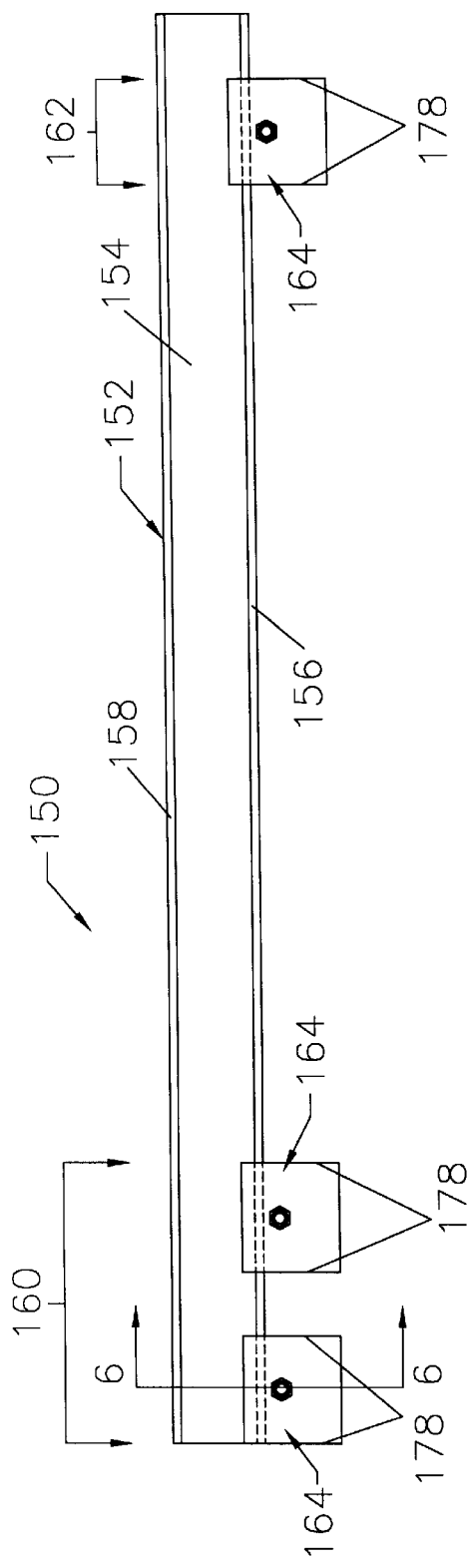
FIG. 5 is a side view of an embodiment which has an elongated body which is an I beam. This embodiment has three heads which are each configured with two indexing faces permitting all heads to be identical and mounted in the same orientation.

FIG. 1 is a side view of a spacing tool 10 of one embodiment of the present invention. The spacing tool 10 has an elongated body 12, an adjustable cradle 14, and an adjustable shoulder 16. The cradle 14 can be adjusted to accommodate a first frame member 18 (shown in phantom) of width W, while the shoulder 16 can be spaced apart from the cradle 14 so as to engage a second frame member 20 (shown in phantom) when the first frame member 18 is separated from the second frame member 20 by a spacing interval I.

The elongated body 12 has a T-shaped cross section (shown in FIG. 2), with a rectangular section 22 and a lower flange 24. A longitudinal axis 26 of the elongated body 12 passes through the rectangular section 22. The lower flange 24 extends from the rectangular section 22 and is perpendicular thereto, and is bounded by a first terminal flange edge 28 and a second terminal flange edge 30 (shown in FIG. 2). The first terminal flange edge 28 extends parallel to the longitudinal axis 26 and provides a first track which extends along the elongated body 12. Similarly, the second terminal flange edge 30 extends parallel to the longitudinal axis 26 and provides a second track which extends along the elongated body 12.

The cradle 14, which slidably engages the elongated body 12, is formed by a first head 32 and a second head 34 which slidably engage the lower flange 24 of the elongated body 12. The first head 32 and second head 34 can be independently moved along the elongated body 12, allowing the first head 32 and second head 34 to be adjustable with respect to each other.

Similarly, the shoulder 16 is formed by a third head 36 which slidably engages the lower flange 24 of the elongated body 12, allowing the third head 36 to be adjustable with respect to the cradle 14 formed by the first head 32 and the second head 34.

In this embodiment, the first head 32, the second head 34, and the third head 36 are identical. The heads (32, 34, and 36) each have indexing faces 38 which are substantially normal to the longitudinal axis 26 of the elongated body 12. The second head 34 is slidably engaged with the elongated body 12 such that it is in an opposed relationship to the first head 32, and their indexing faces 38 are in a face-to-face relationship and are spaced apart by a separation width W, which is sufficient to accommodate the first frame member 18. The first head 32 and the second head 34 are then locked with respect to the elongated body 12 and each other to maintain the separation width W.

The third head 36, which slidably engages the elongated body 12, is spaced apart from the cradle 14 formed by the first head 32 and the second head 34 such that the indexing face 38 of the third head 36 engages the second frame member 20 when it is separated from the first frame member 18 by the spacing interval I. Preferably, the third head 36 is positioned such that, were the first head 32 translated by the spacing interval I, it would be superimposed on the third head, in which case the spacing interval I between the framing members (18 and 20) will be the same as the separation between the first head 32 and third head 36. The spacing interval I between the first and second frame members (18 and 20) is maintained by locking the third head 36 with respect to the cradle 14.

Alternatively, the third head 36 can be positioned such that it corresponds to a translation of the second head 34 by the spacing interval I. However, such an orientation of the third head 36 will prevent the indexing face 38 of the third head 36 from being brought longitudinally into engagement with the second frame member 20 without lifting the third head 36 of the spacing tool 10 above the plane in which the frame members (18 and 20) reside.

FIG. 2 is a view from plane 2—2 of FIG. 1, and illustrates how the first head 32 slidably engages the elongated member 12. The view shows the first head 32; however, the elements discussed are the same for the remaining heads (34 and 36) and will be referred to generically in the discussion of the figure. The heads (32, 34, and 36) each have a first channel 50 and a second channel 52. The first channel 50 slidably engages the lower flange 24 between the first terminal flange edge 28 of the lower flange 24 and the rectangular section 22 of the elongated body 12, while the second channel 52 slidably engages the lower flange 24 between the second terminal flange edge 30 and the rectangular section 22 of the elongated body 12.

Threaded shafts 54 are provided which threadably engage and pass through each of the heads (32, 34, and 36). The threaded shafts 54 serve as head body-engaging elements. When each threaded shaft 54 is turned, threads 56 serve as means for bringing the head body-engaging element into forcible engagement with the elongated body 12, since, as the threaded shaft 54 is advanced, it forcibly engages the lower flange 24 of the elongated body 12, preventing any longitudinal movement between the heads (32, 34, or 36) and the elongated body 12.

FIG. 3 is a side view of a spacing tool 100 of a second embodiment of the present invention. The spacing tool 100 has an elongated body 102, an adjustable cradle 104 formed by a first head 106 and a second head 108, and an adjustable shoulder 110 formed by a third head 112.

The elongated body 102 of the spacing tool 100 is substantially T shaped, having a rectangular section 114 and a lower flange 116. The lower flange 116 is bounded by a first terminal flange edge 118 and a second terminal flange edge 120 (shown in FIG. 4). For the spacing tool 100, the first terminal flange edge 118 and the second terminal flange edge 120 serve, respectively, as a first track and a second track. The elongated body 102 of this embodiment is provided with a tapered top edge 122 having periodic markings 124, making it suitable for use as a measuring stick. Currently, elongated bodies in such a configuration are available which include levels. One such level is described in U.S. Pat. No. 5,279,041. Thus the heads (106, 108, and 112) have utility in their own right as attachments for levelling instruments to convert them into spacing tools.

The first head 106, the second head 108, and the third head 112 each have bolt passages 126 (shown in FIG. 4) and, with the exception of the orientation of the bolt passages 126, are identical. Each head (106, 108, and 112) slidably engages the lower flange 116 of the elongated body 102. Each of the heads (106, 108, and 112) has an indexing face 128, which performs the same function as the indexing faces 38 of the embodiment shown in FIGS. 1 and 2.

FIG. 4, which is a view of section 4—4 of FIG. 3, shows additional details of the first head 106, which is representative of the structure of the second head 108 and the third head 112. The discussion will treat the heads (106, 108, and 112) in a generic manner. The heads (106, 108 and 112) each have a head slot 130 having a slot main body-embracing region 132 and a slot extension region 134. A first channel 136 and a second channel 138 reside in the slot main body-embracing region 132 of the head slot 130. The first channel 136 has a first channel base surface 140 which slidably engages the first terminal flange edge 118 of the lower flange 116. The second channel 138 has a second channel base surface 142 which slidably engages the second terminal flange edge 120 of the lower flange 116.

The first channel base surface 140 and the second channel base surface 142 are separated by a head gap separation S. The first channel base surface 140 provides a first locking component, while the second channel base surface 142 provides a second locking component, and in combination the two locking components provide a head body-engaging element. A locking bolt 144 passes through the bolt passage 126 in each of the heads (106, 108, and 112), traversing the slot extension region 134. The locking bolt 144, in combination with a bolt nut 146, provides a means for reducing the head gap separation S. When the locking bolt 144 is tightened, reducing the width of the slot extension region 134, the head gap separation S is reduced between the first channel base surface 140 and the second channel base surface 142. As the head gap separation S is reduced, the first channel base surface 140 and the second channel base surface 142 are advanced towards each other so as to forcibly engage, respectively, the first terminal flange edge 118 and the second terminal flange edge 120, preventing any longitudinal movement between the first head 106 and the lower flange 116 of the elongated body 102.

For the embodiment shown in FIGS. 3 and 4, the first head 106, the second head 108, and the third head 112 are not identical. They differ since the bolt passage 126 in the second head 108 is reversed in orientation with respect to the bolt head passages 126 in the first head 106 and the third head 112. This difference allows all bolts to have their heads on the same side of the spacing tool 100, which aids in adjusting the position of the heads (106, 108, and 112).

Figure 6:
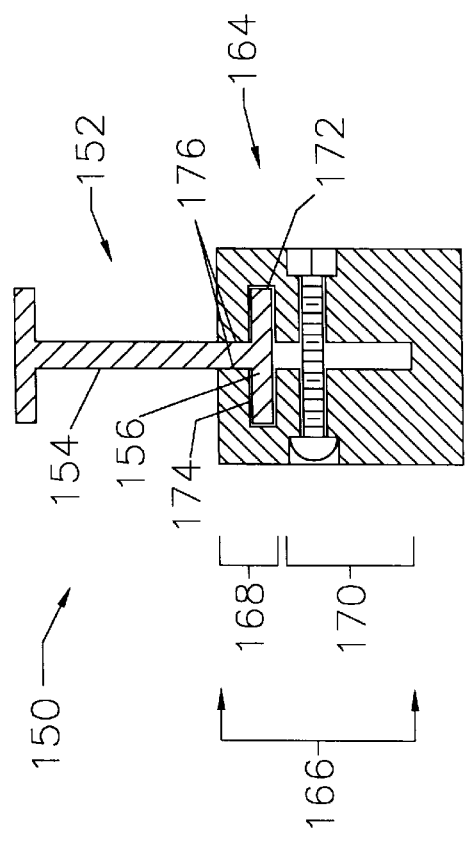
FIG. 6 is a view of the section 6—6 of FIG. 5.

FIGS. 5 and 6 illustrate a spacing tool 150 of another embodiment of the present invention. The spacing tool 150 employs an elongated body 152 which differs from the elongated body 102 of FIGS. 3 and 4 and is formed from an I-beam, having a rectangular section 154, a lower flange 156, and an upper flange 158. The addition of the upper flange 158 increases the rigidity of the elongated body 152.

The spacing tool 150 also has a cradle 160 and a shoulder 162. Both the cradle 160 and the shoulder 162 are formed by heads 164, which are identical. Referring to FIG. 6, each of the heads 164 has a head slot 166, having a slot main body-embracing region 168 and a slot extension region 170. A first channel 172 and a second channel 174 reside in the slot main body embracing region 168 and slidably engage the lower flange 156 and a portion of the rectangular section 154 of the elongated body 152. In this embodiment, main slot walls 176 reside in the main body-embracing region 168 and serve as the locking component. The main slot walls 176 are separated by a head gap separation S.

In this embodiment, the heads 164 are each bounded by paired index faces 178 which are both normal to the flanges (156 and 158) when the heads 164 are slidably engaged with the elongated body 152. The symmetry of the heads 164 allows them to be mounted to the elongated body 152 with the same orientation.

Figure 7:
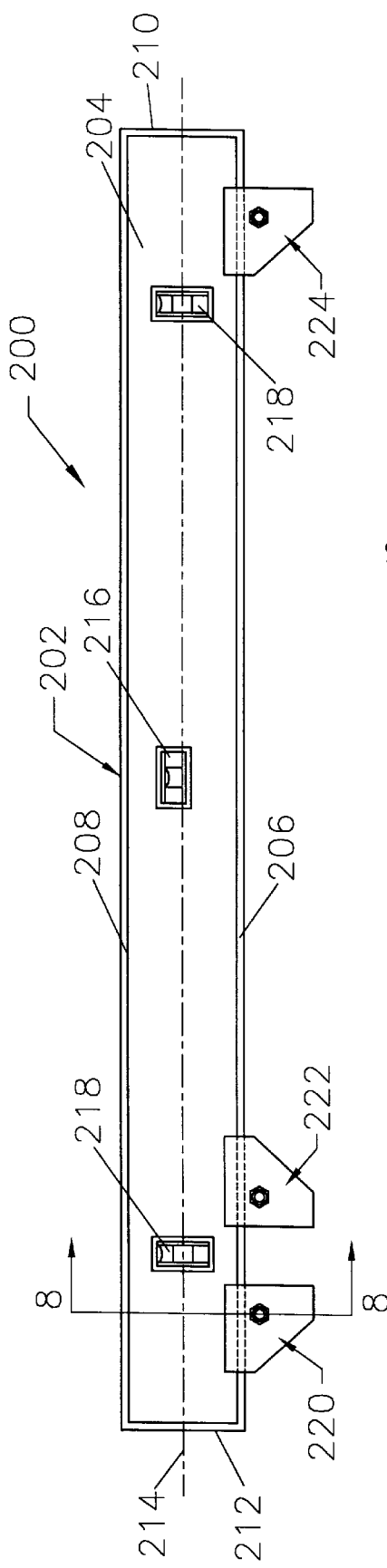
FIG. 7 is a side view of an embodiment having three heads which are 2-part structures and, additionally, has an elongated body which is formed by commercially available I-beam levelling instrument which has a lower flange and an upper flange. The level has a horizontal bubble level aligned with the lower and upper flanges and two vertical bubble levels mounted normal to the lower and upper flanges.

FIG. 7 shows a spacing and levelling tool 200 of another embodiment of the present invention, which employs a conventional levelling instrument 202 such as is commercially available as the elongated body. This levelling instrument 202 has a rectangular section 204 bounded by a lower flange 206, an upper flange 208, a first flange cap 210, and a second flange cap 212. The levelling instrument 202 has a central axis 214 which is parallel to the lower flange 206 and the upper flange 208 and lies therebetween. A first bubble level 216 is provided, which is parallel to the central axis 214. A pair of vertical bubble levels 218 are also provided, which are spaced apart and positioned such that they are perpendicular to the central axis 214 and normal to the lower flange 206 and the upper flange 208.

Figure 8:
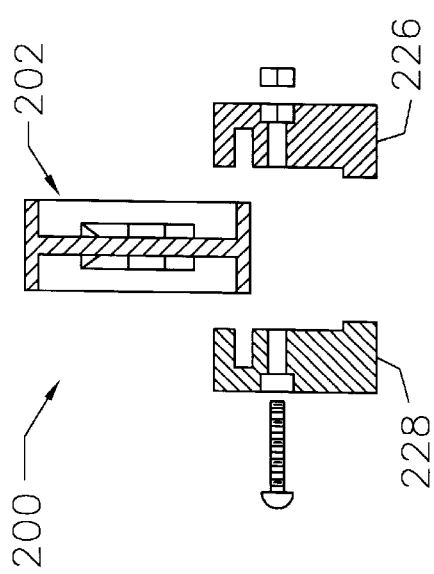
FIG. 8 is an exploded view of section 8—8 of FIG. 7, showing additional details of one of the heads. A first head section has a first channel, and a second head section has a second channel. The head sections are held together by a locking bolt and associated locking nut which serve as a means for bringing a first channel base surface and a second channel base surface into forcible engagement with the elongated body.

In this embodiment, a first head 220, a second head 222, and a third head 224 are provided which are substantially similar to the heads (106, 108 and 112) of the embodiment of FIGS. 3 and 4, differing only in that each of the heads is formed in two parts, a first head section 226 and a second head section 228 (illustrated in an exploded view in FIG. 8). The split head construction facilitates the addition of the heads (220, 222, and 224) onto a preexisting level instrument 202.

Figure 9:
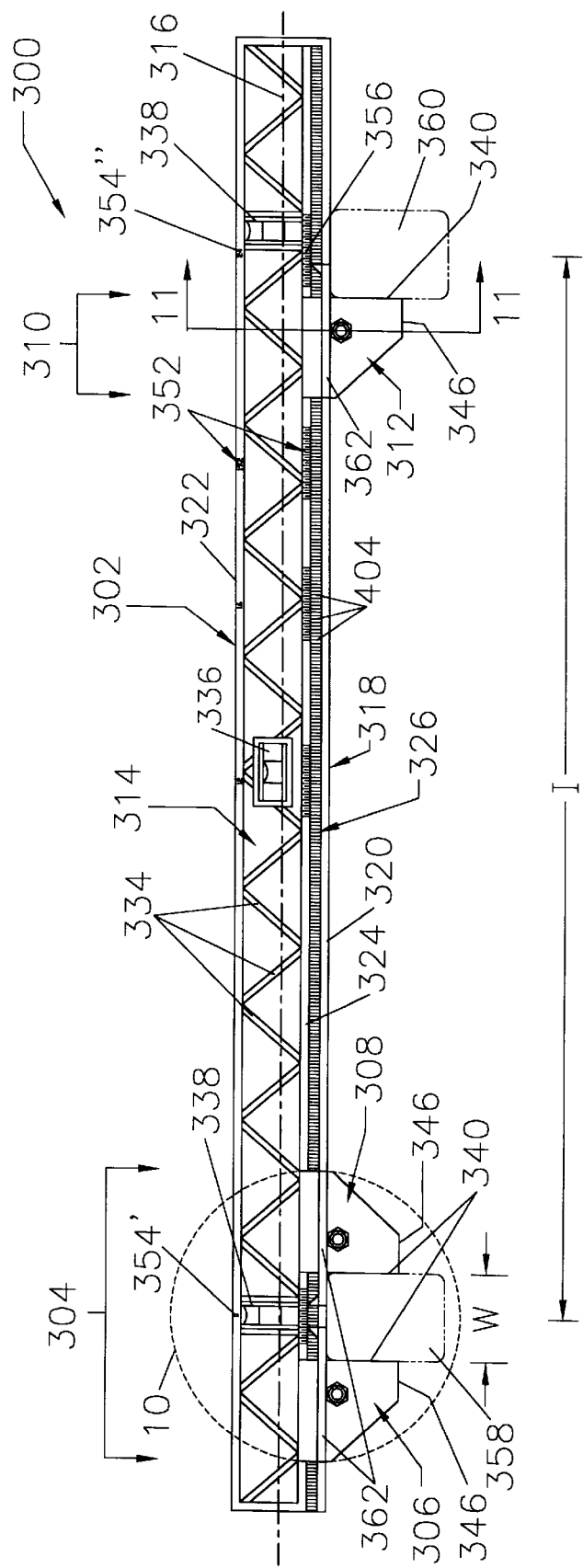
FIG. 9 is a side view of an embodiment having an elongated body formed by a modified I beam, having a rectangular section, a lower flange, an upper flange, a first rail spaced apart from the lower flange to form a first longitudinal slot which serves as a first track, and a second rail (shown in FIG. 11) spaced apart from the lower flange to form a second longitudinal slot which serves as a second track. Truss supports between the first rail and the upper flange and between the second rail and the upper flange provide the elongated body with increased rigidity. The elongated body also has indicia, facilitating positioning the three heads. Each of the heads has paired ears which are co-planar with the lower flange of the elongated body.

FIG. 9 is a side view of a spacing and levelling tool 300 which forms another embodiment of the present invention. The spacing and levelling tool 300 has an elongated body 302, an adjustable cradle 304 formed by a first head 306 and a second head 308, and an adjustable shoulder 310 formed by a third head 312.

The elongated body 302 has a rectangular section 314 containing a longitudinal axis 316 of the elongated body 302, a lower flange 318 which is bounded by a first terminal flange edge 320 and a second terminal flange edge 321 (shown in FIG. 11), and an upper flange 322. The lower flange 318 and upper flange 322 are parallel to the longitudinal axis 316.

The elongated body 302 is provided with a first rail 324 which is positioned in a parallel relationship to the lower flange 318, the first rail 324 being separated from the lower flange 318 such that the first rail 324 and the lower flange 318, in combination with the rectangular section 314 of the elongated body 302, form a first longitudinal slot 326. The first longitudinal slot 326 is aligned with the longitudinal axis 316 of the elongated body 302 and, in this embodiment, serves as a first track.

The elongated body 302 is also provided with a second rail 330 (shown in FIG. 11) which is positioned in a parallel relationship to the lower flange 318. The second rail 330 is separated from the lower flange 318 such that the second rail 330 and lower flange 318, in combination with the rectangular section 314 of the elongated body 302, form a second longitudinal slot 332. The second longitudinal slot 332 is aligned with the longitudinal axis 316 of the elongated body 302 and, in this embodiment, serves as a second track.

Truss supports 334 are provided between the first rail 324 and the upper flange 322 and between the second rail 330 and the upper flange 322. The truss supports 334 provide the elongated body 302 with increased stability and rigidity.

The elongated body 302 is provided with a horizontal bubble level 336, and two vertical bubble levels 338. The horizontal bubble level 336 is aligned with the longitudinal axis 316 of the elongated body 302, and indicates to the user of the spacing and levelling tool 300 when the elongated body 302 is level. The vertical bubble levels 338 are mounted normal to the longitudinal axis 316, the upper flange 322, and the lower flange 318, and indicate to the user when the elongated body 302 is plumb. The upper flange 322 of the elongated body 302 provides a continuous reference surface for levelling.

Frequently, wall framing modules are assembled on a horizontal surface. As each module is completed, it is raised to a vertical position for installation into adjacent completed wall sections. The provision of the vertical bubble levels 338 in the spacing and levelling tool 300 allows it to be used to assure that wall modules are plumb prior to attachment to adjacent completed wall sections.

The first head 306, the second head 308, and the third head 312 all have substantially the same structure and slidably engage the first longitudinal slot 326 and the second longitudinal slot 332 of the elongated body 302. In view of the substantial similarity between the first head 306, the second head 308, and the third head 312, they will be referred to collectively except to the extent needed to distinguish between the heads (306, 308, and 312). The heads (306, 308, 312) each have an indexing face 340 which is substantially normal to the longitudinal axis 316 when the head (306, 308, or 312) is slidably engaged with the elongated body 302.

Additionally, the heads (306, 308, and 312) each have a levelling surface 346. The levelling surfaces 346 of the heads (306, 308, and 312) are co-planar when the heads (306, 308, and 312) are slidably engaged with the elongated body 302, and are parallel to the longitudinal axis 316 of the elongated body 302. The levelling surfaces 346 provide a discontinuous reference surface for levelling which can be adjusted to span obstacles on the surface to be levelled.

Figure 10:
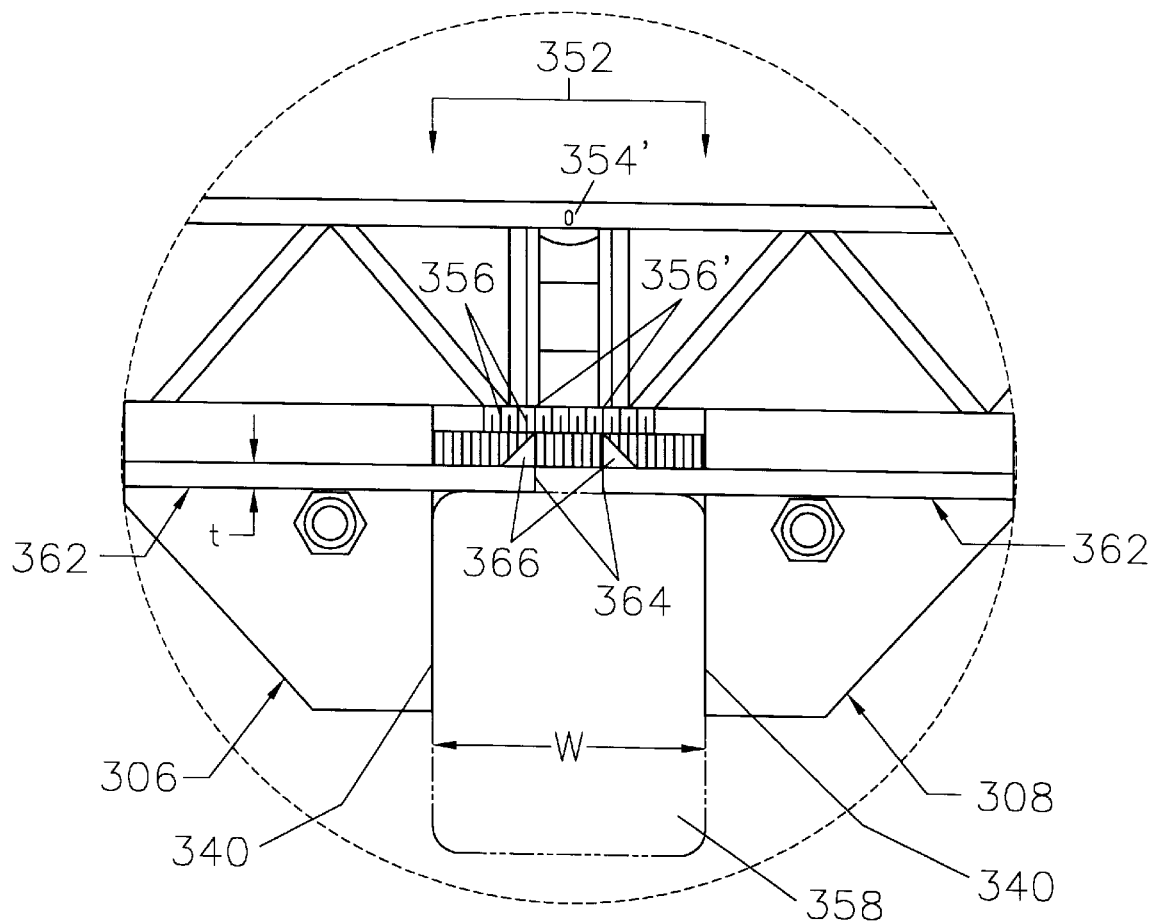
FIG. 10 is an enlarged view of the region 10 of FIG. 9, showing a cradle formed by a first head and a second head. The paired ears of each of the heads have a stop surface and a pointer.

The elongated body 302 of the spacing and levelling tool 300 is also provided with indicia 352, which are shown in greater detail in FIG. 10. The indicia 352 consist of center marks 354 and associated width marks 356. The indicia 352 indicate to the user when the cradle 304, formed by the first head 306 and second head 308, and the shoulder 310, formed by the third head 312, are positioned for spacing a first frame member 358 (shown in phantom) and a second frame member 360 (also shown in phantom) at a desired spacing interval I. The separations between the center marks 354 correspond to the desired spacing intervals I, and typically the center marks 354 will be spaced at 0 inches, 12 inches, 13.7 inches, 16 inches, 19.2 inches, and 24 inches and/or the respective metric equivalents. The provision of the indicia 352 on the elongated body 302 allows the user to position the heads (306, 308, and 312) without the use of a separate measuring device.

The width marks 356 are spaced at regular intervals on either side of their associated center marks 354. The width marks 356 are typically spaced apart a distance of $\frac{1}{16}$ inch.

Figure 11:
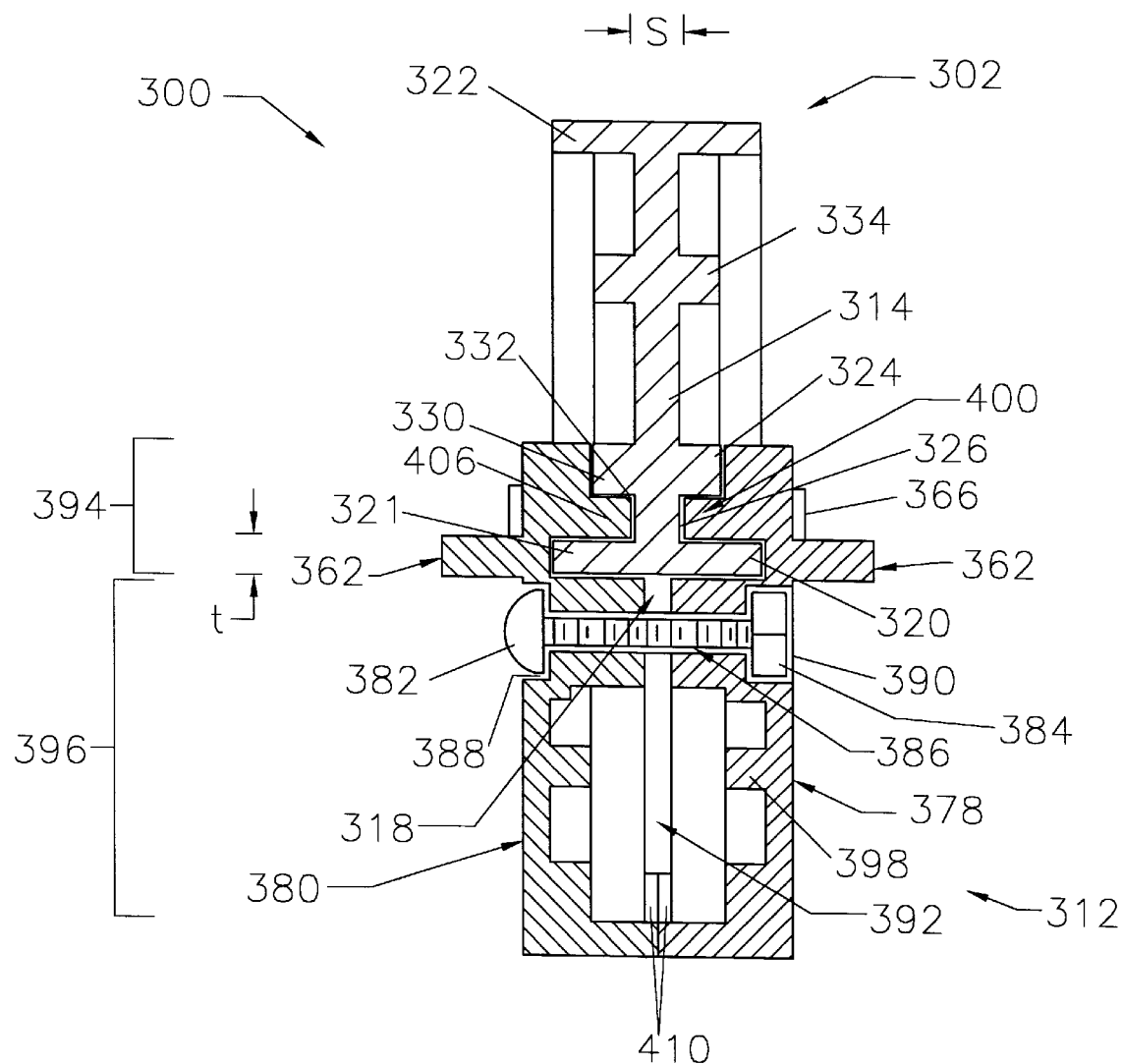
FIG. 11 is a view of section 11—11 of FIG. 9 showing further details of one of the heads, which has a first head section and a second head section, with a head slot therebetween and a locking bolt passing therethrough. The first head section has a first protrusion, while the second head section has a second protrusion, the protrusions slidably engaging the first and second tracks. The locking bolt and associated nut serve as a means for bringing the first protrusion and the second protrusion into forcible engagement with the elongated body.
Figure 12:
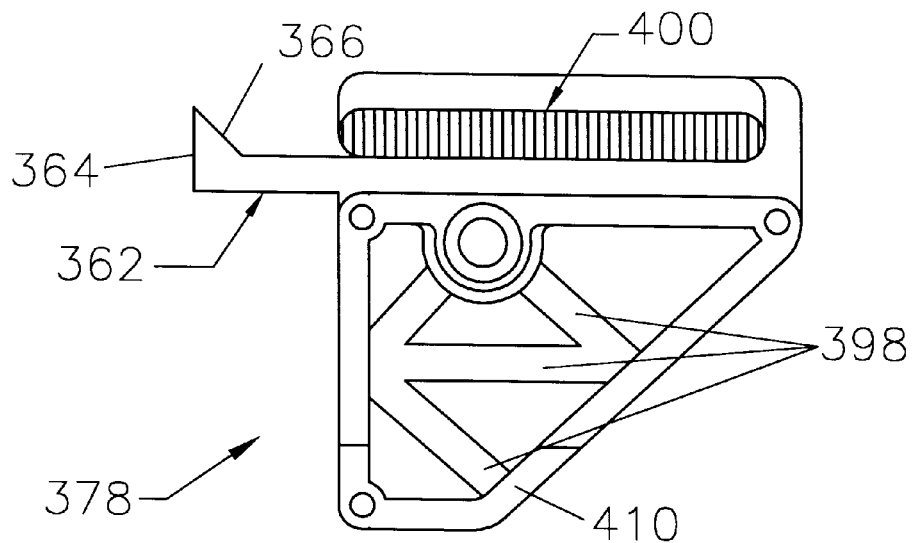
FIG. 12 is a detail view showing the first head section of the head shown in FIG. 11. The first protrusion has protrusion teeth, which are configured to intermesh with the slot teeth provided on the first longitudinal slot.
Figure 13:
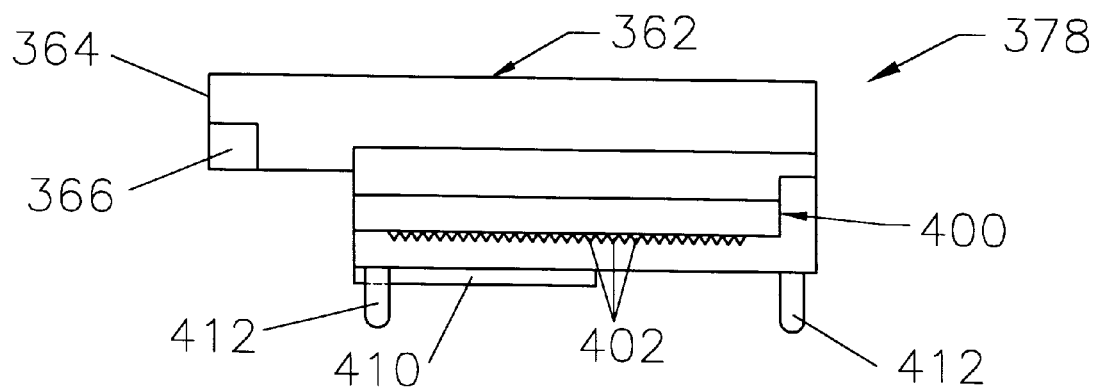
FIG. 13 is a top view of the first head section shown in FIG. 12, showing alignment pins, which slidably engage alignment holes (not shown) in the second head section when the first section and second section are placed together.

The use of the indicia 352 is facilitated by features of the heads (306, 308, and 312) which are shown in FIGS. 11 through 13. These figures show details of the third head 312, which is identical to the first head 306 and differs from the second head 308 only in that the second head 308 is a mirror image of the first and third heads (306 and 312). The details of the heads (306, 308 and 312) will be discussed together with references made to the distinctions.

The heads (306, 308, and 312) are each provided with paired ears 362, which terminate at a head stop surface 364, and a pointer 366 which, in this embodiment, is provided on one of the paired ears 362.

Again referring to FIG. 10, by aligning the pointers 366 of the first and second heads (306 and 308) with a pair of width marks 356' which are equidistant from their associated center mark 354', the first head 306 and the second head 308 will be positioned such that the first frame member 358 of width W engaged thereby will be centered with respect to the associated center mark 354'.

As shown in FIG. 9, the third head 312 will be positioned such that the second frame member 360, when engaged with the indexing face 340 of the third head 312, is centered with respect to the center mark 354" and is separated from the second frame member 360 by the desired spacing interval I, measured from center to center.

The head stop surface 364 of the first head 306 and the head stop surface 364 of the second head 308 are axially aligned and configured to engage each other. It is preferred that, when the head stop surface 364 of the first and second heads (306 and 308) are engaged, the separation width W between the indexing faces 340 of the first and second heads (306 and 308) is at a selected minimum value for the width of the lumber for which it is intended to be used. The minimum value for the separation width W is typically 1½ inches, this separation width W corresponding to the thickness of two inch nominal width lumber, such as is commonly used for studs, joists, and rafters.

As best shown in FIG. 11, the paired ears 362 of the heads (306, 308, and 312) are co-planar with the lower flange 318 of the elongated body 302 when the heads (306, 308, and 312) are slidably engaged with the elongated body 302, and extend on either side of the lower flange 318. The paired ears 362 of the first and second heads (306 and 308) provide increased stability between the cradle 304 formed by the first and second heads (306 and 308) and the first frame member 358. The paired ears 362 of the third head 312 provide increased stability between shoulder 310 formed by the third head 312 and the second frame member 360. Such increased stability is especially desirable when the spacing and levelling tool 300 is used on an inclined surface, such as when spacing prefabricated trusses used for roof systems.

Preferably, the paired ears 362 have a uniform thickness t, allowing the paired ears 362 to be used for spacing decking planks with a gap of width t between the members.

The heads (306, 308 and 312) each have a first head section 378 and a second head section 380, which are secured together by a locking bolt 382 and a locking nut 384. A bolt-nut passage 386 is provided, through which the bolt 382 passes. The bolt-nut passage 386 has a bolt head recess 388 in the second head section 380, and a bolt nut recess 390 in the first head section 378, creating a directionality to the bolt-nut passage 386.

The first head section 378 mates with the second head section 380, forming a head slot 392 therebetween. The head slot 392 has a slot main body-embracing region 394 which slidably engages the elongated body 302, and a slot extension region 396 through which the locking bolt 382 passes.

The first head section 378 and the second head section 380 are preferably hollow forms, with strengthening ribs 398 (best shown in FIG. 12) to increase the rigidity of the first and second head sections (378 and 380).

The first head section 378 of each of the heads (306, 308, and 312) is provided with a first protrusion 400, having first protrusion teeth 402 (shown in FIG. 13). The first protrusion 400 resides in the slot main body-embracing region 394 of the assembled head (306, 308, or 312) and slidably engages the first longitudinal slot 326 of the elongated body 302. The first protrusion teeth 402 are positioned to engage first slot teeth 404 (shown in FIG. 9) provided in the first longitudinal slot 326. Similarly, the second head section 380 of each of the heads (306, 308, and 312) is provided with a second protrusion 406 which resides in the slot main body-embracing region 394 of the assembled head (306, 308, or 312) and slidably engages the second longitudinal slot 332. The first protrusion 400 and the second protrusion 406 are separated by a head gap separation S, and provide, respectively, a first locking component and a second locking component, and, in combination, provide a head body-engaging element. The locking bolt 382 serves as a means for bringing the first locking component and the second locking component into forcible engagement with the elongated body 302. When the locking bolt 382 is tightened, reducing the head gap separation S between the first protrusion 400 and the second protrusion 406, the first protrusion 400 and the second protrusion 406 are advanced towards each other and forcibly engage, respectively, the first longitudinal slot 326 and second longitudinal slot 332 of the elongated body 302. This engagement locks the head (306, 308, or 312) with respect to the first longitudinal slot 326 and second longitudinal slot 332.

A step 410 is provided on both the first head section 378 and the second head section 380, which serves to provide the head slot 392 when the first head section 378 and the second head section 380 are secured together. FIG. 13 shows alignment pins 412, which slidably engage alignment holes (not shown) in the second head section 380 when the first head section 378 and second head section 380 are placed together.

Figure 14:
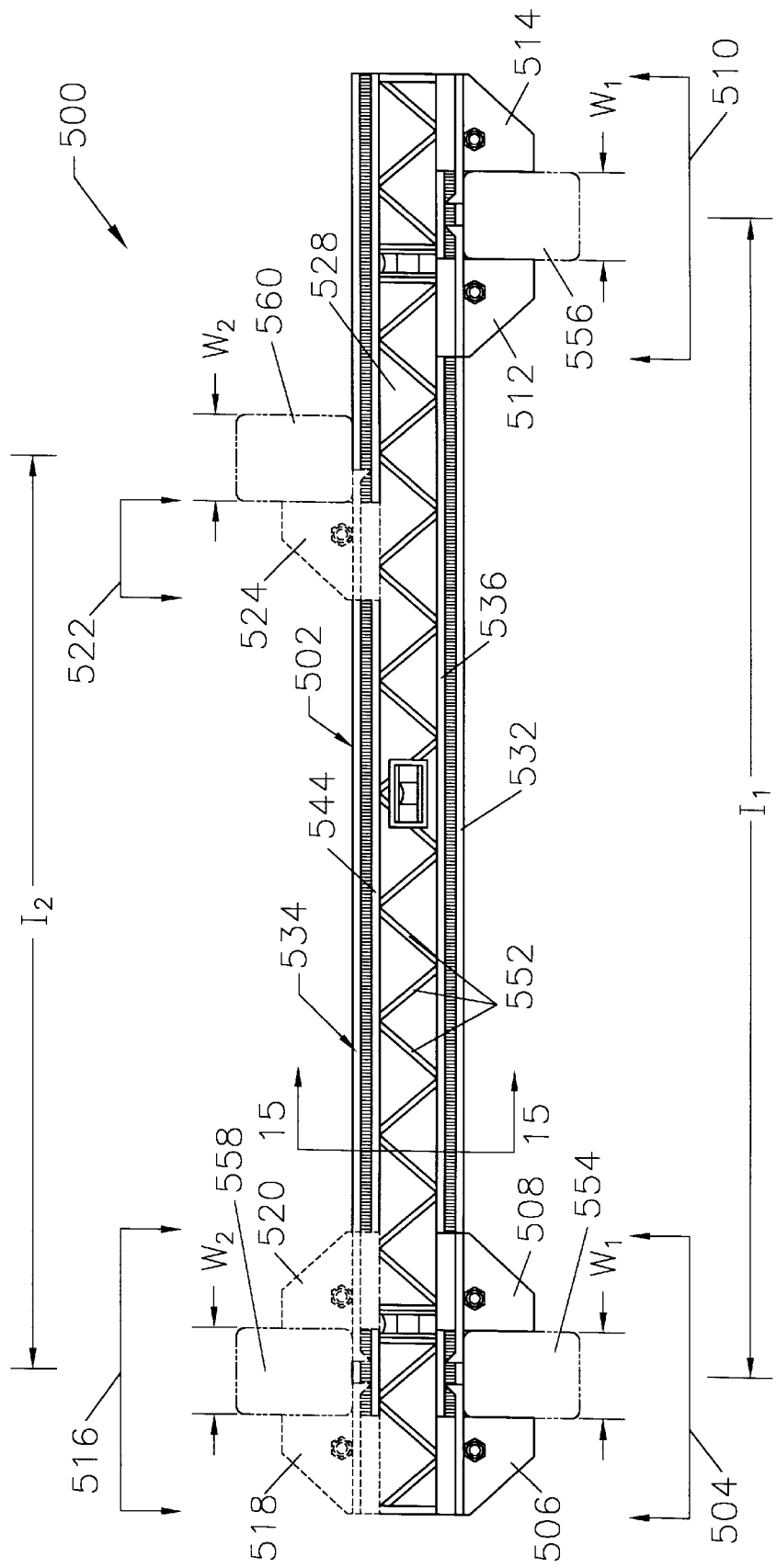
FIG. 14 is a side view of an embodiment which has an elongated body which can accommodate two sets of heads similar to those described for the embodiment illustrated in FIGS. 9 through 13. The elongated body has a first and second track which are in close proximity to a lower flange, and also a third and fourth track in close proximity to an upper flange.

FIG. 14 is a side view of a spacing and levelling tool 500 which forms another embodiment of the present invention. The spacing and levelling tool 500 shares many features in common with the embodiment illustrated in FIGS. 9 through 13. The spacing and levelling tool 500 as illustrated has an elongated body 502, a first cradle 504 formed by a first head 506 and a second head 508, and a second cradle 510 formed by a third head 512 and a fourth head 514. The heads (506, 508, 512, and 514) are essentially similar to the heads (306, 308, and 312) of the spacing and levelling tool 300.

The elongated body 502 of the spacing and levelling tool 500 differs from the elongated body 302 of the embodiment shown in FIGS. 9 through 13 in that it can accommodate additional heads. As shown, the spacing and levelling tool 500 has an upper cradle 516 (shown by hidden lines) formed by a first auxiliary head 518 and a second auxiliary head 520, and an upper shoulder 522 (shown by hidden lines) formed by a third auxiliary head 524. This arrangement allows the spacing and levelling tool 500 to be used to set frame members of two different widths and/or at two different spacing intervals without readjusting the spacing and levelling tool 500.

Figure 15:
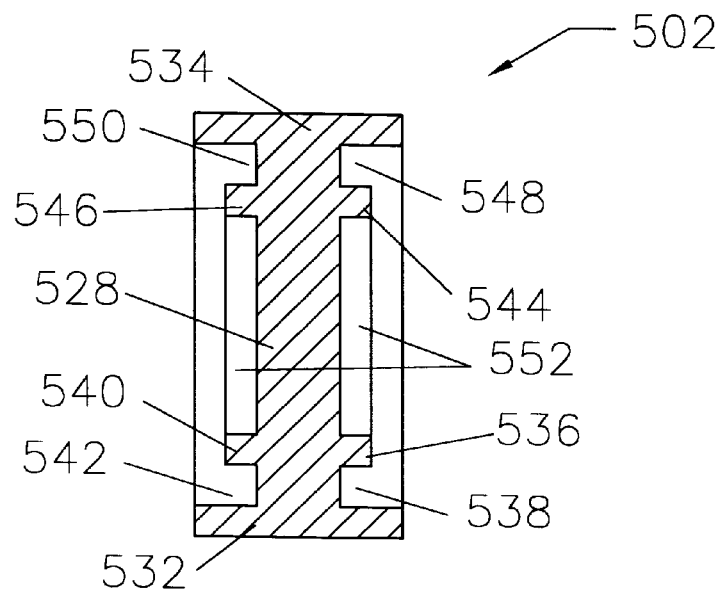
FIG. 15 is a view of the section 15—15 of FIG. 14, showing the symmetrical configuration of the elongated body.

As shown in FIG. 15, the elongated body 502 of the spacing and levelling tool 500 is formed with a rectangular section 528, a lower flange 532, and an upper flange 534.

The elongated body 502 has a first rail 536, which is positioned in a parallel relationship to the lower flange 532 to form a first longitudinal slot 538 which serves as a first track. The elongated body 502 also has a second rail 540, positioned in a parallel relationship to the lower flange 532, forming a second longitudinal slot 542 which serves as a second track.

The elongated body 502 also has a third rail 544 and a fourth rail 546, both positioned in a parallel relationship to the upper flange 534. The third rail 544 and the upper flange 534, in combination with the rectangular section 528 of the elongated body 502, form a third longitudinal slot 548 which serves as a third track. Similarly, the fourth rail 546 and the upper flange 534, in combination with the rectangular section 528 of the elongated body 502, form a fourth longitudinal slot 550 which serves as a fourth track. Truss supports 552 span between the first rail 536 and the third rail 544, and between the second rail 540 and the fourth rail 546. The provision of the third and fourth rails (544 and 546) allows the elongated body 502 to be a symmetrical structure, facilitating fabrication of the elongated body 502 from plastic materials by injection molding with reduced likelihood of warpage.

Referring again to FIG. 14, the first cradle 504, formed by the first head 506 and the second head 508, will typically be adjusted to accommodate a first frame member 554 (shown in phantom) of width $W_1$, while third cradle 516, formed by the third head 512 and the fourth head 514, is adjusted to accommodate a second frame member 556 (shown in phantom), also of width $W_1$. The second cradle 510 is positioned with respect to the first cradle 504 such that the first frame member 554 and the second frame member 556 are separated by a first spacing interval $I_1$ measured from center to center.

Similarly, the upper cradle 516, formed by the first auxiliary head 518 and the second auxiliary head 520, is typically adjusted to accommodate a third frame member 558 (shown in phantom) of width $W_2$, and the upper shoulder 522, formed by the third auxiliary head 524, is adjusted to engage a fourth frame member 560 (shown in phantom), also of width $W_2$, when the third frame member 558 and the fourth frame member 560 are separated by a second spacing interval $I_2$.

Typically, the first spacing interval $I_1$ and the second spacing interval $I_2$ will be different, enabling the user to readily switch between two desired spacing intervals ($I_1$ and $I_2$). Additionally, $W_1$ and $W_2$ may be either the same or different, depending on the framing application. For example, the first and second frame members (554 and 556) may be joists which are manufactured wooden I-beams, having a width $W_1$ of 2 5/16 inches and a spacing interval $I_1$ of 19.2 inches, while the third and fourth frame members (558 and 560) are wooden studs, having a width $W_2$ of 1½ inches and a spacing interval $I_2$ of 16 inches.

Figure 16:
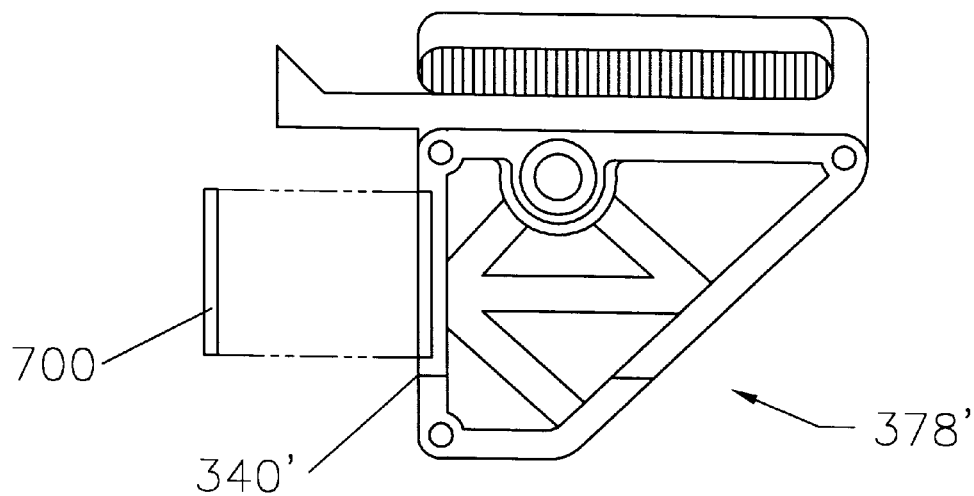
FIG. 16 is an alternative head section having a magnetic insert.

FIG. 16 shows an alternative first head section 378' which is similar to the first head section 378 illustrated in FIG. 12 and which could be employed in a spacing and levelling tool such as the embodiments shown in FIGS. 9 through 15. The first head section 378' differs from the first head section 378 in that it has an indexing face 340' which is provided with a magnetic insert 700, making it well suited for applications where the spacing and levelling tool is to be used with ferromagnetic frame members such as steel studs. When the indexing faces 340' of the heads are provided with magnetic inserts 700, the magnetic inserts 700 hold the spacing and levelling tool in engagement with frame members, freeing the hands of the user for other tasks. Heads having such magnetic inserts 700 could be used for retrofitting existing levels or spacing tools.

It should be appreciated that a spacing and levelling tool similar to the spacing and levelling tools discussed above could be created which has only a first head and a second head, each having a levelling surface. While such a spacing and levelling tool would not enjoy many of the benefits for spacing applications as the three-headed or multi-headed embodiments, the levelling surfaces of the first and second heads would serve to provide a reference surface for levelling which could be adjusted to span obstacles on the surface to be levelled.

While the novel features of the present invention have been described in terms of particular embodiments and preferred applications, it should be appreciated by one skilled in the art that substitution of materials and modification of details obviously can be made without departing from the spirit of the invention.

What we claim is:

1. A spacing tool for setting frame members which have a width W and an inter-member spacing interval I, the spacing tool comprising:
   an elongated body having a longitudinal axis, and a first track and a second track which extend along said body and are parallel to said longitudinal axis;
   a cradle formed by a first head and a second head; and
   a shoulder formed by a third head,
      wherein each of said heads slidably engages said first track and said second track, and further wherein each of said heads further comprises:
         an indexing face for engaging the frame members, said indexing face being substantially normal to said longitudinal axis when said head is slidably engaged with said first track and said second track, and
         means for locking said head with respect to said elongated body,
      whereby said first head and said second head can be disposed along said elongated body in an opposed relationship to form said cradle, with said indexing face of said first head in a face-to-face relationship with said indexing face of said second head, and positioned at a separation width W therefrom, while said third head can be disposed on said elongated body such that it corresponds to a translation of one of said first head and said second head by the spacing interval I.

2. The spacing tool of claim 1 wherein said elongated body further comprises:
   a rectangular section containing said longitudinal axis; and
   a lower flange attached to said rectangular section and extending substantially normal thereto, said lower flange being bounded by a first terminal flange edge and a second terminal flange edge.

3. The spacing tool of claim 2 wherein said means for locking said head with respect to said elongated body further comprises:
   a head body-engaging element provided on said head; and
   means for bringing said head body-engaging element into forcible engagement with said elongated body.

4. The spacing tool of claim 3 wherein said head body-engaging element is a threaded shaft advancably mounted in said head, and further wherein said threads serve as said means for bringing said head body-engaging element into forcible engagement with said elongated body.

5. The spacing tool of claim 3 wherein said head body-engaging element further comprises:

a first locking component; and a second locking component, wherein said first locking component and said second locking component are separated by a head gap separation S and slidably engage said first track and said second track; and further wherein said means for bringing said head body-engaging element into forcible engagement with said elongated body further comprises:

means for varying said head gap separation S.

6. The spacing tool of claim 5 wherein each of said heads further comprises:

a head slot having, a slot main body embracing region with said first locking component and said second locking component mounted therein; and a slot extension region; and further wherein said means for varying said head gap separation S further comprises:

a locking bolt which passes through said head and engages a locking nut, said locking bolt traversing said slot extension region of said head slot.

7. The spacing tool of claim 6, wherein said first terminal flange edge and said second terminal flange edge serve, respectively, as said first track and said second track, and further wherein each of said heads further comprises:

a first channel having a first channel base surface which slidably engages said first terminal flange edge, said first channel base surface serving as said first locking component; and a second channel having a second channel base surface which slidably engages said second terminal flange edge, said second channel base surface serving as said second locking component.

8. The spacing tool of claim 7 wherein each of said heads further comprises:

a first head section having said first channel provided therein;

a second head section having said second channel provided therein, said first head section and said second head section mating to form said head, and being secured to each other by said locking bolt with said head slot being formed therebetween.

9. The framing tool of claim 6 wherein said elongated body further comprises:

a first rail aligned with said longitudinal axis, said first rail and said lower flange providing a first slot which provides said first track;

a second rail aligned with said longitudinal axis, said second rail and said lower flange providing a second slot which provides said second track; and further wherein each of said heads further comprises;

a first protrusion; and a second protrusion, each of said protrusions serving as one of said locking components and being configured to slidably engage a corresponding one of said first slot and said second slot.

10. The spacing tool of claim 9 wherein each of said heads further comprises:

a first head section having said first protrusion provided thereon;

a second head section having said second protrusion provided thereon, said first head section and said second head section mating to form said head, and being secured to each other by said locking bolt with said head slot being formed therebetween.

11. The spacing tool of claim 10 wherein said elongated body further comprises:

an upper flange extending from said rectangular section, said upper flange being perpendicular to said rectangular section and parallel to said lower flange; and truss supports extending from said rectangular section and spanning between said first rail and said upper flange and between said second rail and said upper flange.

12. The spacing tool of claim 11 further comprising:

center marks located at set intervals along said elongated body;

width marks longitudinally spaced on either side of each of said center marks and located in close proximity to at least one of said first longitudinal track and said second longitudinal track;

a pointer provided on each of said heads, said pointers being positionable in close proximity to said width marks.

13. The spacing tool of claim 12 wherein said first locking component of each of said heads and said first longitudinal track are provided with intermeshing teeth, the spacing tool further comprising:

paired ears on each of said heads, said paired ears being co-planar with said lower flange of said elongated body and extending on either side thereof;

a first head stop surface provided on said first head; and a second head stop surface provided on said second head, said second head stop surface being positioned to engage said first head stop surface when said separation width W between said indexing faces of said first head and said second head reaches a set minimum value.

14. The spacing tool of claim 10 further comprising:

an upper flange extending from said rectangular section, said upper flange being perpendicular to said rectangular section and parallel to said lower flange;

a third rail provided on said rectangular section of said elongated body, said third rail being spaced apart from said upper flange to form a third longitudinal slot, said third longitudinal slot providing a third longitudinal track which is parallel with said longitudinal axis;

a fourth rail provided on said rectangular section of said elongated body, said fourth rail being spaced apart from said upper flange to form a fourth longitudinal slot, said fourth longitudinal slot providing a fourth longitudinal track which is parallel with said longitudinal axis; and truss supports extending from said rectangular section and spanning between said first rail and said third rail and between said second rail and said fourth rail.

15. The spacing tool of claim 1 further comprising:

a bubble level provided in said elongated body, said bubble level being aligned with said longitudinal axis;

a levelling surface provided on each of said heads, said levelling surface being parallel with said longitudinal axis of said elongated body, said levelling surfaces of said heads being co-planar with each other.

16. The spacing tool of claim 1 further comprising:

a fourth head which is similar to said first, second, and third heads, having an indexing face and a means for locking said fourth head with respect to said elongated body, whereby said fourth head can be disposed along said elongated body in an opposed relationship to said third head to form a second cradle, with said indexing faces of said third head and said fourth head in a face-to-face relationship with a separation width $W_2$ therebetween.

17. A spacing tool having an elongated body formed by a pre-existing level, the pre-existing level having, a longitudinal axis, a first longitudinal track which is parallel to the longitudinal axis, and a second longitudinal track which is parallel to the longitudinal axis, the spacing tool further comprising:

a first head;

a second head; and a third head, each of said first, second, and third heads slidably engaging the first longitudinal track and the second longitudinal track, each of said heads having, an indexing face which is substantially normal to the longitudinal axis of the pre-existing level when said head is slidably engaged with the first and second longitudinal tracks, and means for locking said head with respect to the pre-existing level;

whereby said first head and said second head can be disposed along the pre-existing level in an opposed relationship, with said indexing face of said first head in a face-to-face relationship with said indexing face of said second head, while said third head can be disposed on the pre-existing level such that it corresponds to a translation of one of said first head and said second head.

18. The spacing tool of claim 17 wherein each of said heads further comprises:

a levelling surface provided on said head, said levelling surface being parallel with said longitudinal axis, said levelling surfaces of said heads being co-planar with each other.

19. An accessory for forming a spacing tool from a pre-existing level, the pre-existing level having, a longitudinal axis, a first longitudinal track which is parallel to the longitudinal axis, and a second longitudinal track which is parallel to the longitudinal axis, the accessory comprising a first head, a second head, and a third head, each of said heads being slidably engagable with the first longitudinal track and the second longitudinal track of the pre-existing level and further comprising:

an indexing face for engaging frame members, said indexing face being substantially normal to the longitudinal axis of the pre-existing level; and means for locking said head with respect to the pre-existing level, whereby said first head and said second head can be disposed along the pre-existing level in an opposed relationship, with said indexing face of said first head in a face-to-face relationship with said indexing face of said second head, while said third head can be disposed on the pre-existing level such that it corresponds to a translation of one of said first head and said second head.

20. The accessory of claim 19 wherein each of the heads further comprises:

a levelling surface, said levelling surfaces being co-planar with each other and parallel to said longitudinal axis.

21. The accessory of claim 20 wherein each of the heads further comprises:

a magnetic insert in said indexing face.

22. A spacing and levelling tool for setting a spacing interval between frame members and levelling discontinuous surfaces, the spacing and levelling tool comprising:

an elongated body having a longitudinal axis, a first longitudinal track, and a second longitudinal track, said first longitudinal track and said second longitudinal track being parallel to said longitudinal axis;

a bubble level provided in said elongated body, said bubble level being aligned with said longitudinal axis;

a first head; and a second head, each of said first and second heads slidably engaging said first longitudinal track and said second longitudinal track of said elongated body and having, an indexing face for engaging the frame members, said indexing face being substantially normal to said longitudinal axis, means for locking said head with respect to said elongated body, and a levelling surface, said levelling surfaces being co-planar with each other and parallel to said longitudinal axis.

* * * * *